US012800956B2

(12) United States Patent
Liebenberg et al.

(10) Patent No.: US 12,800,956 B2
(45) Date of Patent: Nov. 17, 2026

(54) OPTICAL MODULATOR

(71) Applicant: ASML Netherlands B.V., Veldhoven (NL)

(72) Inventors: Christoffel Johannes Liebenberg, San Marcos, CA (US); Peter Frans Maria Muys, Ghent (BE); Heine Melle Mulder, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 1137 days.

(21) Appl. No.: 17/762,982

(22) PCT Filed: Sep. 17, 2020

(86) PCT No.: PCT/EP2020/075958
§ 371 (c)(1),
(2) Date: Mar. 23, 2022

(87) PCT Pub. No.: WO2021/073829
PCT Pub. Date: Apr. 22, 2021

(65) Prior Publication Data

US 2022/0350181 A1 Nov. 3, 2022

Related U.S. Application Data

(60) Provisional application No. 62/914,909, filed on Oct. 14, 2019.

(51) Int. Cl.
*G02F 1/11* (2006.01)
*G02F 1/00* (2006.01)
*H05G 2/00* (2006.01)

(52) U.S. Cl.
CPC .............. *G02F 1/11* (2013.01); *G02F 1/0063* (2013.01); *G02F 1/0072* (2013.01); *G02F 1/009* (2013.01); *H05G 2/0086* (2024.08)

(58) Field of Classification Search
None
See application file for complete search history.

(56) References Cited

U.S. PATENT DOCUMENTS 3,653,746 A 4/1972 Warner, Jr.
3,867,108 A * 2/1975 Alphonse .................. G02F 1/33 428/629

(Continued)

FOREIGN PATENT DOCUMENTS

CN 101896864 A 11/2010
CN 202111365 U 1/2012

(Continued)

OTHER PUBLICATIONS

Patrick Diot, European International Searching Authority, International Search Report and Written Opinion, counterpart PCT Application No. PCT/EP2020/075958, mailed Nov. 12, 2020, 12 pages total.

(Continued)

*Primary Examiner* — Sharrief I Broome
*Assistant Examiner* — Journey F Sumlar
(74) *Attorney, Agent, or Firm* — DiBerardino McGovern IP Group LLC

(57) ABSTRACT

An optical modulator includes an acousto-optic assembly and a thermal management apparatus. The acousto-optic assembly includes: an acousto-optic material; a first side configured to receive an incident light beam; and a second side configured to emit an output light beam based on the incident light beam. The thermal management apparatus includes: a first thermally conductive material in thermal contact with the first side of the acousto-optic assembly; and a second thermally conductive material in thermal contact with the second side of the acousto-optic assembly.

22 Claims, 10 Drawing Sheets

410B

(56) References Cited

U.S. PATENT DOCUMENTS

| | | | | |
|---|---|---|---|---|
| 4,509,829 | A | 4/1985 | Peterson | |
| 4,659,184 | A | 4/1987 | Sohn | |
| 4,792,930 | A | 12/1988 | Kobayashi et al. | |
| 5,363,391 | A | 11/1994 | Matthews et al. | |
| 6,567,434 | B2 | 5/2003 | Spinelli et al. | |
| 2003/0030886 | A1* | 2/2003 | Thomas | G02F 1/33 359/305 |
| 2005/0117198 | A1 | 6/2005 | Minemoto et al. | |
| 2005/0276053 | A1* | 12/2005 | Nortrup | F21V 29/67 362/234 |
| 2006/0088067 | A1 | 4/2006 | Vetrovec et al. | |
| 2009/0122814 | A1 | 5/2009 | Draper | |
| 2009/0217705 | A1* | 9/2009 | Filippov | C03B 17/064 65/99.1 |
| 2012/0105931 | A1 | 5/2012 | Deri et al. | |
| 2012/0269214 | A1 | 10/2012 | Li et al. | |
| 2014/0218795 | A1 | 8/2014 | Scerbak | |
| 2014/0233005 | A1 | 8/2014 | Crouch et al. | |
| 2014/0238477 | A1 | 8/2014 | Fucinato | |
| 2014/0346376 | A1 | 11/2014 | Nowak et al. | |
| 2017/0164267 | A1* | 6/2017 | Marka | H04W 52/0251 |
| 2017/0242158 | A1 | 8/2017 | Muhr et al. | |
| 2018/0136541 | A1 | 5/2018 | Rafac | |
| 2018/0323572 | A1 | 11/2018 | Mildren et al. | |

FOREIGN PATENT DOCUMENTS

| | | | |
|---|---|---|---|
| CN | 1499244 | A | 8/2014 |
| GB | 2534937 | A | 8/2016 |
| JP | H01131527 | A | 5/1989 |
| KR | 19980027515 | A * | 7/1998 |
| KR | 2015-0119054 | A | 10/2015 |
| KR | 2018-0105124 | A | 9/2018 |

OTHER PUBLICATIONS

Godfried et al., "Use of CVD diamond in high-power CO2 lasers and laser diode arrays," Proc. SPIE, vol. 3889, pp. 553-563, Apr. 3, 2000, DOI: 10.1117/12.380930.

Maclean et al., "Continuous Tuning and Efficient Intracavity Second-Harmonic Generation in a Semiconductor Disk Laser With an Intracavity Diamond Heatspreader," IEEE J. Quantum Elec., vol. 44, No. 3, pp. 216-225, Mar. 2008.

Mildren et al., "Diamond enables combination of non-collinear kilowatt beams," SPIE Newsroom, Sep. 29, 2016, DOI: 10.1117/2.1201608.006667.

Peach, "Element Six launches all-diamond window for high power lasers," optics.org, Nov. 10, 2015, available at http://optics.org/news/6/11/17.

* cited by examiner

OPTICAL MODULATOR

CROSS-REFERENCE TO RELATED APPLICATIONS

This application claims priority of U.S. application 62/914,909 which was filed on 14 Oct. 2019, and which is incorporated herein in its entirety by reference.

TECHNICAL FIELD

This disclosure relates to an optical modulator. The optical modulator may be used in an optical system such as, for example, an extreme ultraviolet (EUV) light source.

BACKGROUND

An optical modulator is a device that is used to modulate a beam of light. For example, the optical modulator may modulate (or change) a property of an input light beam to form an output light beam that has one or more properties that are different from the input light beam. For example, the optical modulator may modulate (or change) an intensity and/or phase of the input light beam to form an output light beam that has a different intensity and/or phase of the input light beam.

SUMMARY

In one aspect, an optical modulator includes an acousto-optic assembly and a thermal management apparatus. The acousto-optic assembly includes: an acousto-optic material; a first side configured to receive an incident light beam; and a second side configured to emit an output light beam based on the incident light beam. The thermal management apparatus includes: a first thermally conductive material in thermal contact with the first side of the acousto-optic assembly; and a second thermally conductive material in thermal contact with the second side of the acousto-optic assembly.

Implementations may include one or more of the following features. The first side of the acousto-optic assembly may include a first side of the acousto-optic material, the second side of the acousto-optic assembly may include a second side of the acousto-optic material, the first thermally conductive material may be in thermal contact with the first side of the acousto-optic material, and the second thermally conductive material may be in in thermal contact with the second side of the acousto-optic material. The first thermally conductive material may be attached to the first side by a Van der Waals force, and the second thermally conductive material may be attached to the second side by a Van der Waals force.

The first thermally conductive material may have a first thickness along a direction of propagation of an incident pulsed light beam, and the first thickness may be an integer multiple of one-fourth of a wavelength of the incident pulsed light beam; and the second thermally conductive material may have a second thickness along a direction of propagation of the incident pulsed light beam, and the second thickness may be an integer multiple of one-fourth of a wavelength of the pulsed light beam.

The thermal management apparatus also may include a heat sink in thermal contact with the first thermally conductive material and the second thermally conductive material. The acousto-optic material may include a first side; a second side; a third side; and a fourth side, and the heat sink may be attached to the third side or the fourth side. The heat sink may include a first heat sink portion and a second heat sink portion, the first heat sink portion may be attached to the third side of the acousto-optic material, and the second heat sink portion may be attached to the fourth side of the acousto-optic material. The heat sink may include a water-cooled metal block. The metal block may be copper.

The first thermally conductive material may include diamond and the second thermally conductive material may include diamond.

The optical modulator also may include a first index matching material between the acousto-optic material and the first thermally conductive material, and a second index matching material between the acousto-optic material and the second thermally conductive material.

The first thermally conductive material may be attached to the first side of the acousto-optic assembly by an adhesive or a mechanical clamp, and the second thermally conductive material may be attached to the second side of the acousto-optic assembly by an adhesive or a mechanical clamp. The acousto-optic assembly also may include a first anti-reflection between the first thermally conductive material and the acousto-optic material, and a second anti-reflection between the second thermally conductive material and the acousto-optic material, the first thermally conductive material may be in thermal contact with the first side of the acousto-optic assembly by being attached first anti-reflection coating, and the second thermally conductive material may be in thermal contact with the second side of the acousto-optic assembly by being attached to the second anti-reflection coating. At least one of the first anti-reflection coating and the second anti-reflection coating may be an ion beam sputtering (IBS) layer.

The acousto-optic assembly also may include a first structure at the first side, a second structure at the second side, the first structure may be configured to reduce reflection of the incident light beam, and the second structure may be configured to reduce reflection of the incident light beam. The first structure may be a first moth-eye optic, and the second structure may be a second moth-eye optic.

The acousto-optic material may be germanium (Ge) or gallium arsenide (GaAs).

One or more of the first thermally conductive material and the second thermally conductive material may transmit wavelengths between 9 microns (μm) and 11 μm.

The first thermally conductive material may have an extent that is less than the extent of the acousto-optic material in at least one direction, or the second thermally conductive may have an extent that is less than the extent of the acousto-optic material in at least one direction.

The first thermally conductive material and the second thermally conductive material may be polycrystalline diamond or monocrystalline diamond.

The first thermally conductive material and the second thermally conductive material may have a surface roughness of less than 5 nanometers (nm).

In another general aspect, an extreme ultraviolet (EUV) light source includes: an optical source configured to emit a pulsed light beam onto a beam path; an optical modulator; and a thermal management apparatus. The optical modulator includes: a modulation assembly including: an acousto-optic material on the beam path, the acousto-optic material having an index of refraction that varies based on an applied acoustic signal; a first side configured to receive the pulsed light beam from the optical source; and a second side configured to emit an output light beam based on the pulsed light beam. The thermal management apparatus includes: a first thermally conductive material in thermal contact with the first side of the modulation assembly; and a second thermally conductive material in thermal contact with the second side of the modulation assembly. The EUV light source also includes a vacuum chamber that includes an interior configured to receive the output light beam at a target region.

Implementations may include one or more of the following features. The first thermally conductive material may have a first thickness along a direction of propagation of the pulsed light beam, and the first thickness may be an integer multiple of one-fourth of a wavelength of the pulsed light beam;

and the second thermally conductive material may have a second thickness along a direction of propagation of the pulsed light beam, and the second thickness may be an integer multiple of one-fourth of a wavelength of the pulsed light beam.

The first thermally conductive material may have a first thickness along a direction of propagation of the pulsed light beam, and the first thickness may be one quarter more than an integer multiple of a half wavelength of the pulsed light beam.

The pulsed light beam may have a wavelength between 9 microns (μm) and 11 μm.

The thermal management apparatus also may include a heat sink in thermal contact with the first thermally conductive material and the second thermally conductive material.

In some implementations, the acousto-optic material includes: a first side; a second side; a third side; and a fourth side, and the heat sink is attached to the third side or the fourth side. The heat sink may include a first heat sink portion and a second heat sink portion, the first heat sink portion may be attached to the third side of the acousto-optic material, and the second heat sink portion may be attached to the fourth side of the acousto-optic material.

The first thermally conductive material may be attached to the acousto-optic material by a Van der Waals force, and the second thermally conductive material may be attached to the acousto-optic material by a Van der Waals force.

The modulation assembly also may include a first anti-reflection coating on the acousto-optic material, the first anti-reflection coating is between the acousto-optic material and the first thermally conductive material, a second anti-reflection coating on the acousto-optic material, and the second anti-reflection coating is between the acousto-optic material and the second thermally conductive material.

The acousto-optic material also may include a first structure at the first side, a second structure at the second side, the first structure is configured to reduce reflection of the incident light beam, and the second structure is configured to reduce reflection of the incident light beam.

The first thermally conductive material may have an extent that is less than the extent of the acousto-optic material in at least one direction, or the second thermally conductive material may have an extent that is less than the extent of the acousto-optic material in at least one direction.

The first thermally conductive material may have an extent that is less than the extent of the acousto-optic material in at least one direction, and the second thermally conductive material may have an extent that is less than the extent of the acousto-optic material in at least one direction.

In another general aspect, an optical modulator includes an optical assembly and a thermal management apparatus. The optical assembly includes: an optical material; a first side configured to receive an incident light beam; and a second side configured to emit an output light beam based on the incident light beam. The thermal management apparatus includes: a first thermally conductive material in thermal contact with the first side of the optical assembly.

Implementations may include one or more of the following features. The optical material may include an electro-optic material. The optical material may be cadmium telluride (CdTe) or cadmium Zinc Telluride (CZT).

Implementations of any of the techniques described above may include an EUV light source that includes an optical modulator, a system, a method, a process, a device, or an apparatus. The details of one or more implementations are set forth in the accompanying drawings and the description below. Other features will be apparent from the description and drawings, and from the claims.

DRAWING DESCRIPTION

DETAILED DESCRIPTION

Figure 1:
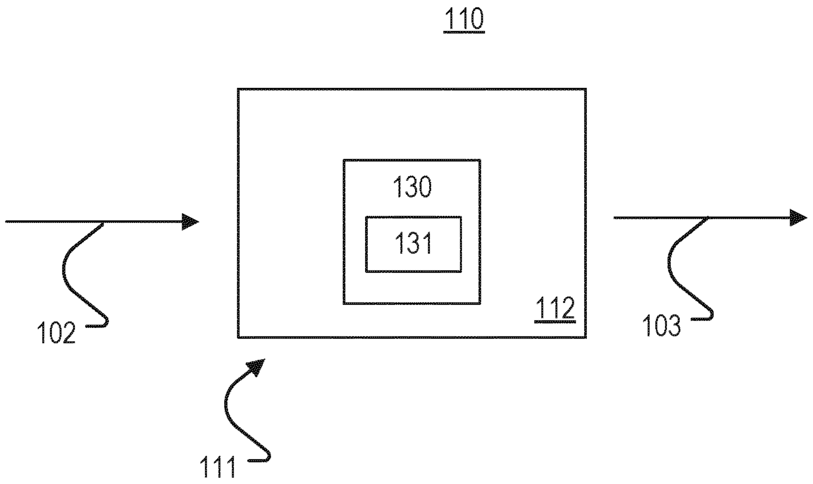
FIG. 1 is a block diagram of an implementation of an optical modulator.

Referring to FIG. 1, a block diagram of an optical modulator 110 is shown. The optical modulator 110 includes a modulation assembly 111 and a thermal management apparatus 130. The modulation assembly 111 includes a modulation material 112. The modulation material 112 may be any material capable of modulating one or more properties of an input light beam 102. In the example discussed below, the modulation material is an acousto-optic material 112, and the optical modulator 110 is an acousto-optic modulator (AOM). Other types of optical modulators may be used with the thermal management apparatus 130. For example, in some implementations, the material 112 is an electro-optic material that is not necessarily an acousto-optic material. An electro-optic material is an optical material that has properties (for example, index of refraction) that vary based on an applied electric field. For example, the material 112 may be cadmium telluride (CdTe) or cadmium zinc telluride (CZT).

The optical modulator 110 modulates one or more properties of the input light beam 102 to produce an output light beam 103. The input light beam 102 is incident on the acousto-optic material 112 and propagates in the acousto-optic material 112. Interactions between the acousto-optic material 112 and the light beam 102 may cause the acousto-optic material 112 to increase in temperature. Excess increases in temperature or excessing heating may damage the acousto-optic material 112. The thermal management apparatus 130 mitigates or prevents thermal damage to the modulation assembly 111 and/or the acousto-optic material 112.

In an optical modulator that lacks the thermal management apparatus 130, incident light deposits heat in the acousto-optic material and/or on an anti-reflection coating (such as the coatings 419*a*, 419*b* of FIG. 4A) that is on the acousto-optic material. Excess heat may cause thermal damage to the acousto-optic material and/or the anti-reflection coating. For example, excess heat may lead to thermal lensing, shortened lifetime, and/or other effects that negatively affect performance.

On the other hand, the optical modulator 110 includes the thermal management apparatus 130, which mitigates or prevents thermal damage by removing heat from the acousto-optic material 112. The thermal management apparatus 130 includes a thermally conductive material 131 that is in thermal contact with the acousto-optic material 112. The thermally conductive material 131 has a higher thermal conductivity than the acousto-optic material 112. For example, the acousto-optic material 112 may be germanium (Ge), and the thermally conductive material 131 may be diamond, polycrystalline diamond or monocrystalline diamond.

Because the thermally conductive material 131 has a higher thermal conductivity than the acousto-optic material 112, the thermally conductive material 131 is able to conduct excess heat away from the acousto-optic material 112.

In this way, the thermal management apparatus 130 removes heat from the acousto-optic material 112, thereby preventing or reducing thermal damage to the material 112 and allowing the optical modulator 110 to be more effectively used for a longer period of time in a system that provides a high-power input beam 102 to the optical modulator 110 or a system in which high-power reflections of the input beam 102 propagate. For example, as compared to a traditional optical modulator, the optical modulator 110 with the thermal management apparatus 130 may be used more effectively and for a longer period of time in an extreme ultraviolet (EUV) light source in which the input light beam 102 is an infrared light beam (for example, a carbon dioxide laser beam) that has a high average power, e.g., 200 watts (W) or more.

Figure 2A:
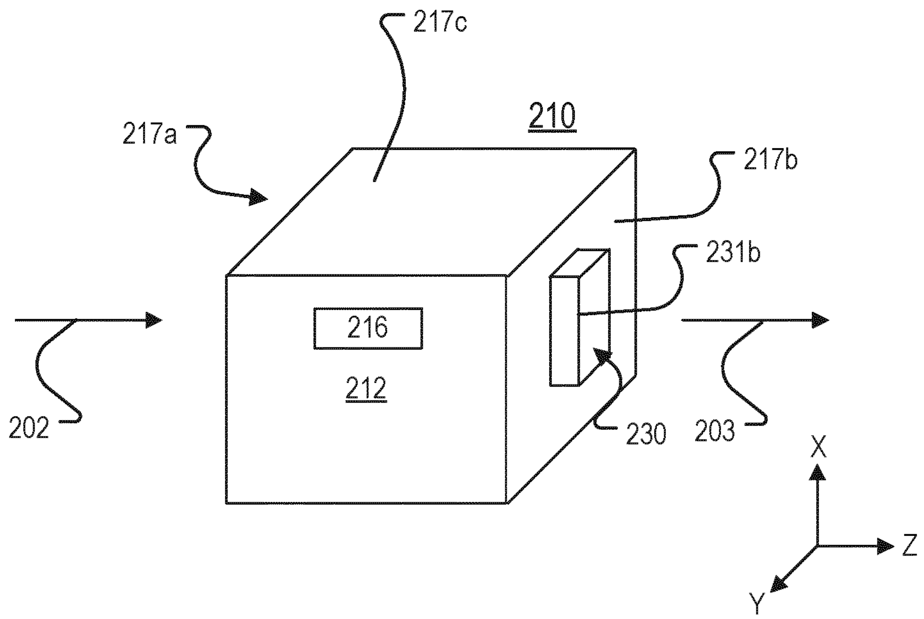
FIGS. 2A-2C are various views of another implementation of an optical modulator.
Figure 2B:
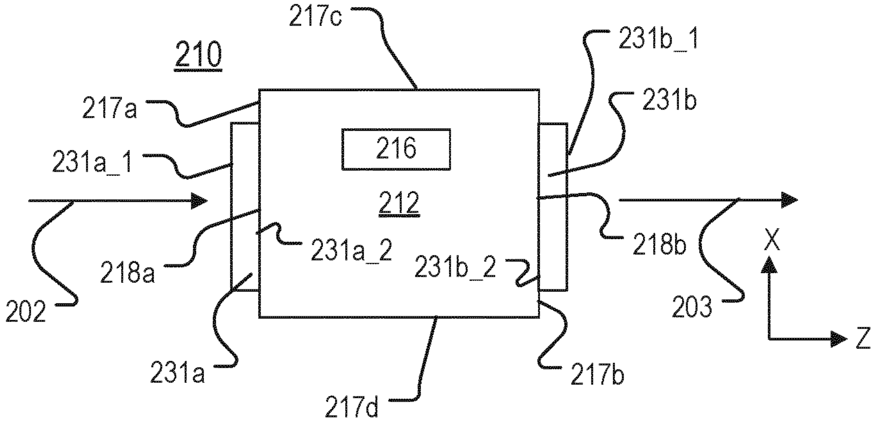
Figure 2C:
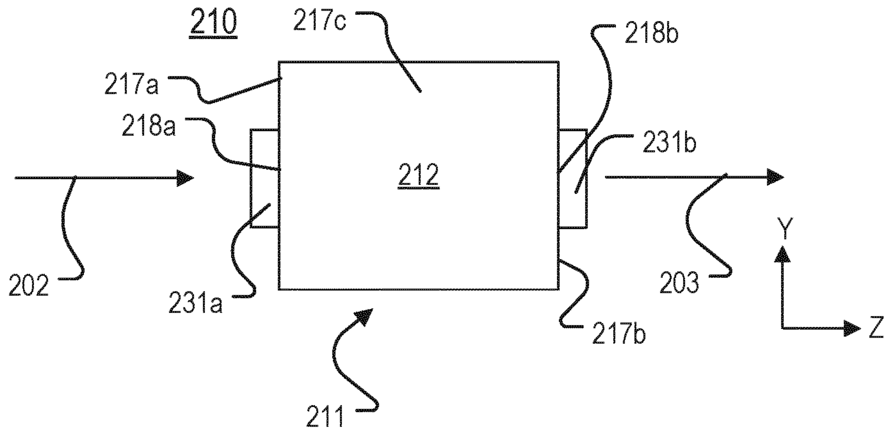

Referring to FIGS. 2A-2C, an optical modulator 210 is shown. The optical modulator 210 is an implementation of the optical modulator 110 (FIG. 1). FIG. 2A is a perspective view of the optical modulator 210. FIG. 2B is a side view of the optical modulator 210 in the X-Z plane. FIG. 2C is a side view of the optical modulator 210 in the Y-Z plane.

The optical modulator 210 modulates one or more properties of an input light beam 202 to produce an output light beam 203. The optical modulator 210 may modulate, for example, an amplitude or phase of the light beam 202 to produce the output light beam 203. In the example of FIGS. 2A-2C, the light beam 202 and the output light beam 203 propagate generally in the Z direction. The input light beam 202 and the output light beam 203 do not both necessarily propagate in the same direction. For example, the input light beam 202 may propagate in the Z direction and the optical modulator 210 may deflect light such that the output light beam 203 propagates along a direction that is at an angle of about 4 degrees relative to the Z direction.

The optical modulator 210 includes a modulation assembly 211, which includes an acousto-optic material 212, and a thermal management apparatus 230. An overview of the acousto-optic material 212 is discussed prior to discussing the thermal management apparatus 230 in more detail.

The acousto-optic material 212 has an index of refraction that varies based on an acoustic wave generated by a transducer 216. The transducer 216 may be, for example, a piezoelectric transducer that is mechanically coupled to the acousto-optic material 212. Motions of the transducer 216 are transferred to the acousto-optic material 212 as an acoustic wave that propagates in the acousto-optic material 212. The propagating acoustic wave forms regions of compression (higher index of refraction) and regions of rarefication (lower index of refraction) in the acousto-optic material 212. The regions of compression and rarefication create a transient diffractive element in the acousto-optic material 212. The transient diffractive element is a spatially-varying index of refraction pattern that travels in the acousto-optic material 212 at the speed of sound of the acousto-optic material 212. The diffractive element is transient and is present in the acousto-optic material 212 only when the acoustic wave propagates in the acousto-optic material 212. In other words, the diffractive element is transient or temporary as opposed to permanent, and the diffractive element is positioned in a particular location within the acousto-optic material 212 only for an instant in time. An interaction between the transient diffractive element and the input light beam 202 results in amplitude modulation, phase modulation and/or deflection of the light beam 202 such that the optical modulator 210 may be used as a shutter that is capable of blocking the incident light beam 202 at certain times. When the transient diffractive element is not present, the acousto-optic material 212 transmits incident light without substantial degradation.

The acousto-optic material 212 is a three-dimensional body. In the example of FIGS. 2A-2C, the acousto-optic material 212 is a generally cuboid shaped object. However, the acousto-optic material 212 may have other shapes. The acousto-optic material 212 includes sides 217*a* and 217*b*, which are generally flat surfaces that extend in the X-Y plane. The acousto-optic material 212 also includes sides 217*c* and 217*d*, which extend in the Y-Z plane.

The thermal management apparatus 230 includes a first thermally conductive material 231*a* and a second thermally conductive material 231*b*. The thermally conductive materials 231*a*, 231*b* are three-dimensional bodies. The thermally conductive materials 231*a*, 231*b* include generally flat surfaces 231*a*_1, 231*a*_2 and 231*b*_1, 231*b*_2, respectively, that extend in the X-Y plane. The surface 231*a*_2 is attached to or held to the side 217*a*. The surface 231*b*_2 is attached to or held to the side 217*b*. The flat surfaces 231*a*_1 and 231*a*_2 are separated in the Z direction by a distance that corresponds to an extent of the thermally conductive material 231*a* in the Z direction. The flat surfaces 231*b*_1 and 231*b*_2 are separated in the Z direction by a distance that corresponds to an extent of the thermally conductive material 231*b* in the Z direction.

The acousto-optic material 212, the first thermally conductive material 231*a*, and the second thermally conductive material 231*b* are made from material that transmits light at the wavelength or wavelengths of the input light beam 202. In operational use, the first thermally conductive material 231*a* receives the input light beam 202. The input light beam 202 passes through the first thermally conductive material 231*a*, through a region 218*a*, and into the acousto-optic material 212. The region 218*a* is a region on the side 217*a* that receives the input light beam 202. The region 218*a* is also referred to as an irradiation region 218*a*. The input light beam 202 propagates in the acousto-optic material 212 and exits through an irradiation region 218*b*, which is on the side 217*b*, as the output light beam 203. The output light beam 203 propagates through the second thermally conductive material 231*b*, and then exits the optical modulator 210 through the surface 231*b*_1.

The thermally conductive materials 231*a*, 231*b* also reflect some incident light at the surfaces 231*a*_1, 231*a*_2, 231*b*_1, and 231*b*_2. The reflections are generally undesirable. In some implementations, the thermally conductive material 231*a* and/or the thermally conductive material 231*b* has an extent in the direction of propagation of the input light beam 202 (the Z direction in this example) that provides an anti-reflection effect. For example, the extent of the thermally conductive material 231*a* and/or the thermally conductive material 231*b* in the Z direction may be chosen such that the total reflected light from the surfaces 231*a*_1, 231*a*_2 and/or 231*b*_1, 231*b*_2 is minimized. In some implementations, the extent of the thermally conductive materials 231*a* and 231*b* in the Z direction is chosen such that the optical pathlength of a reflected ray within each of the thermally conductive materials 231*a*, 231*b* is an odd multiple of a quarter of the wavelength of the incident light. In some implementations, the extent of the thermally conductive materials 231*a*, 231*b* in the Z direction is referred to as L and is provided by Equation 1:

$$L = \frac{(1+2j)\lambda}{4n\cos(\theta)}, \quad \text{Equation (1)}$$

where j is a non-negative integer, is the vacuum wavelength of the light, θ is the angle of refraction of light within the thermally conductive material 231*a*, 231*b*, and *n* is the index of refraction of the thermally conductive material 231*a*, 231*b*.

The surface 231*a*_2 is in thermal contact with the first side 217*a* of the acousto-optic material 212 such that heat may be transferred from the acousto-optic material 212 to the second thermally conductive material 231*a*. The surface 231*b*_2 is in thermal contact with the second side 217*b* such that heat may be transferred from the acousto-optic material 212 to the second thermally conductive material 231*b*.

The first thermally conductive material 231*a* has a first thermal conductivity (k1). The second thermally conductive material 231*b* has a second thermal conductivity (k2). The acousto-optic material 212 has a thermal conductivity (k_ao). The thermal conductivities k1 and k2 are greater than the thermal conductivity k_ao. (Alternatively, or in addition, the thermally conductive material 231*a* and/or 231*b* may have a relatively lower thermal conductivity, but a higher thickness or other geometry that nonetheless allows for high thermal conduction.) For example, the first thermally conductive material 231*a* and the second thermally conductive material 231*b* may be diamond, for example, poly-crystalline or mono-crystalline diamond, or another suitable thermally conductive material, and the acousto-optic material 212 may be germanium (Ge) or gallium arsenide (GaAs). The thermal conductivity of mono-crystalline diamond is about 2050 watt per meter Kelvin ($W\ m^{-1}\ K^{-1}$), the thermal conductivity of GaAs is about 48 $W\ m^{-1}\ K^{-1}$, and the thermal conductivity of Ge is about 59 $W\ m^{-1}\ K^{-1}$. In some implementations, the thermal conductivities k1 and k2 are more than an order of magnitude greater than the thermal conductivity (k_ao) of the material 212.

Thermal conductivity is a measure of how effectively a substance conducts heat. For two bodies that have the same geometry and the same boundary conditions but are made of substances with different thermal conductivities, heat transfer occurs at a higher rate in the body made of the substance with the higher thermal conductivity than in the body made of the substance with the lower thermal conductivity. The following is provided as an example of the thermal behavior of the optical modulator 110. The light beam 202 is incident on and heats the first thermally conductive material 231*a*. The first thermally conductive material 231*a* dissipates heat relatively rapidly due to the relatively high thermal conductivity k1. Thus, the heat does not build up in the first thermally conductive material 231*a*. The light beam 202 passes through the first thermally conductive material 231*a* and into the acousto-optic material 212. The interaction between the light beam 202 and the acousto-optic material 212 heats up the material 214. The acousto-optic material 212 becomes warmer than the first thermally conductive material 231*a*. Heat flows from a relatively warmer environment toward a relatively cooler environment. Thus, heat flows out of the acousto-optic material 212 and into the first thermally conductive material 231*a*. The light beam 202 passes through the acousto-optic material 212 and through the second thermally conductive material 231*b*. Heat deposited in the acousto-optic material 212 also flows into the second thermally conductive material 231*b*. Thus, the thermal management apparatus 230 (which includes the first and second thermally conductive materials 231*a*, 231*b*) reduces heat in the acousto-optic material 212. The heat flow may be more complex than the example discussed above. The geometry (for example, the dimensions) of the thermally conductive materials 231*a* and 231*b* is chosen so as to make the thermally conductive materials 231*a* and 231*b* the lowest resistance paths for heat flow.

The thermally conductive material 231*a*, 231*b* may be held to the acousto-optic material 212 at the respective side 217*a*, 217*b* by a separate substance or device. The separate substance or device may be, for example, adhesive or a mechanical clamp that holds the thermally conductive material 231*a*, 231*b* without affecting the propagation of light in the acousto-optic material 212. For example, the adhesive or clamp may be positioned away from the irradiation regions 218*a* and 218*b*.

Figure 3A:
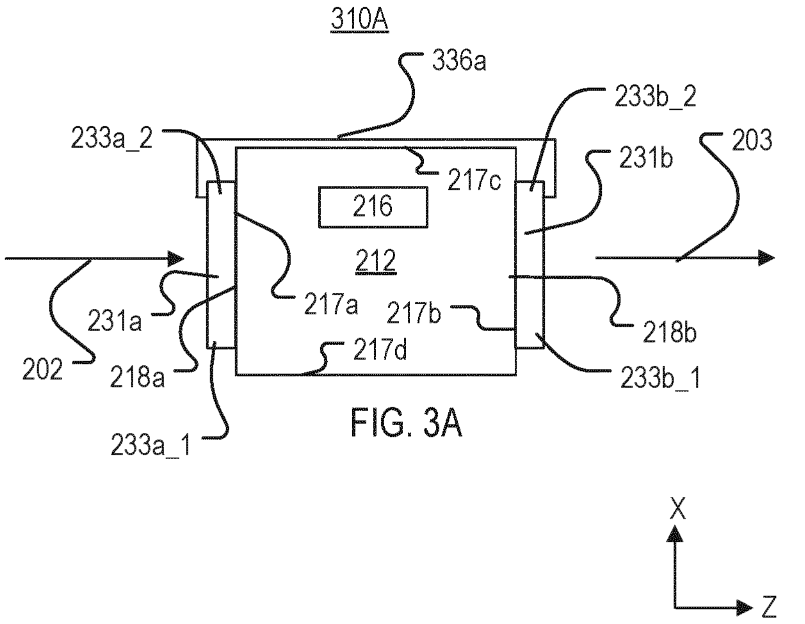
FIGS. 3A and 3B are block diagrams of another implementation of an optical modulator.

Referring also to FIG. 3A, an implementation in which the thermally conductive materials 231*a* and 231*b* are held against the acousto-optic material 212 with a clamp 336*a* is shown. In the example of FIG. 3A, the clamp 336*a* exerts force in the Z direction on the first thermally conductive material 231*a* and a force in the −Z direction on the second thermally conductive material 231*b*. As a result, the thermally conductive materials 231*a*, 231*b* are held against the respective side 217*a*, 217*b*. In the example shown, the clamp 336*a* extends along the side 217*c* and is attached to ends 233*a*_2 and 233*b*_2 of the respective thermally conductive materials 231*a*, 231*b*. The ends 233*a*_2 and 233*b*_2 are away from the regions 218*a*, 218*b*. Thus, the clamp 336*a* does not affect the production of the output beam 203. In some implementations, a second clamp extends along the side 217*d* and is attached to ends 233*a*_1 and 233*b*_1 of the respective thermally conductive materials 231*a*, 231*b*.

Figure 3B:
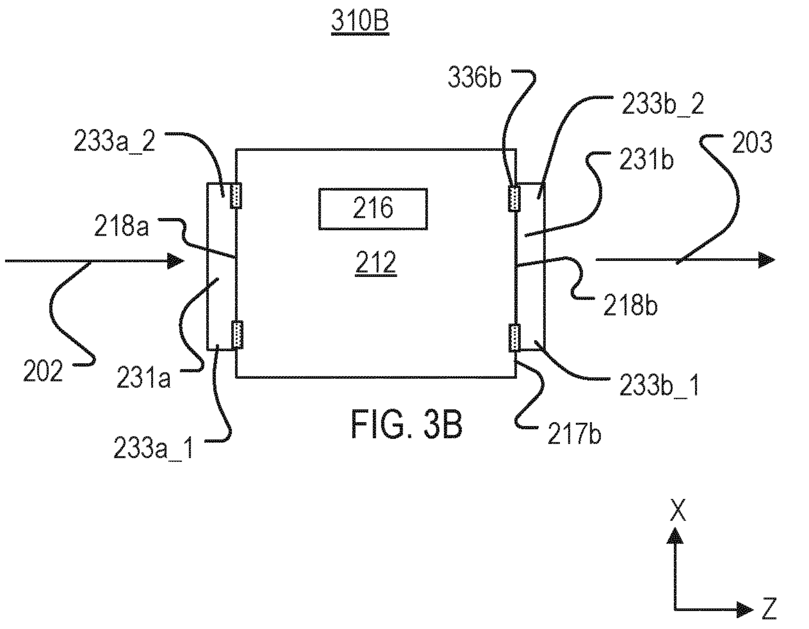

Referring also to FIG. 3B, an implementation in which the thermally conductive materials 231*a* and 231*b* are attached to the acousto-optic material 212 by an adhesive 336*b* is shown. The adhesive 336*b* is between the acousto-optic material 212 and the thermally conductive materials 231*a*, 231*b*. The adhesive 336*b* is applied away from the regions 218*a*, 218*b* and does not affect the production of the output light beam 203. Other implementations are possible.

Furthermore, in some implementations, the thermally conductive material 231*a*, 231*b* is held to the acousto-optic material 212 at the respective side 217*a*, 217*b* without a separate substance or device. For example, the thermally conductive material 231*a*, 231*b* may be held to the acousto-optic material 212 at the respective side 217*a*, 217*b* by a Van der Waals force. In these implementations, the surface 231*a*_2 is conformal with the side 217*a*, and the surface 231*b*_2 is conformal with the side 217*b*. These surfaces may be conformal with each other to an accuracy of, for example, 10 angstroms (1 nanometer) or better. Moreover, the surface roughness of the surface 231*a*_2 and the surface 231*b*_2 is relatively low to encourage attraction between the thermally conductive materials 231*a*, 231*b* and the respective sides 217*a*, 217*b* of the acousto-optic material 212. For example, the surfaces 231*a*_2 and 231*b*_2 may be treated such that these surfaces have a surface roughness of less than 5 nm.

In the example of FIGS. 2A-2C, 3A, and 3B, the side 217*a* has a greater extent in the X-Y plane than the thermally conductive material 231*a*, and the side 217*b* has a greater extent in the X-Y plane than the thermally conductive material 231*b*. However, other implementations are possible. For example, the thermally conductive material 231*a* or 231*b* may have a greater extent in the X and/or Y direction than the respective side 217*a* or 271*b*. Moreover, in the example of FIGS. 2A-2C, 3A, and 3B, the thermally conductive materials 231*a*, 231*b* are the same size and shape and have a rectangular shape in the X-Y plane. However, other implementations are possible. For example, the thermally conductive materials 231*a*, 231*b* may have a square, circular, or elliptical shape in the X-Y plane. Moreover, the thermally conductive material 231*a* may have a different size and/or shape than the thermally conductive material 231*b*.

Figure 4A:
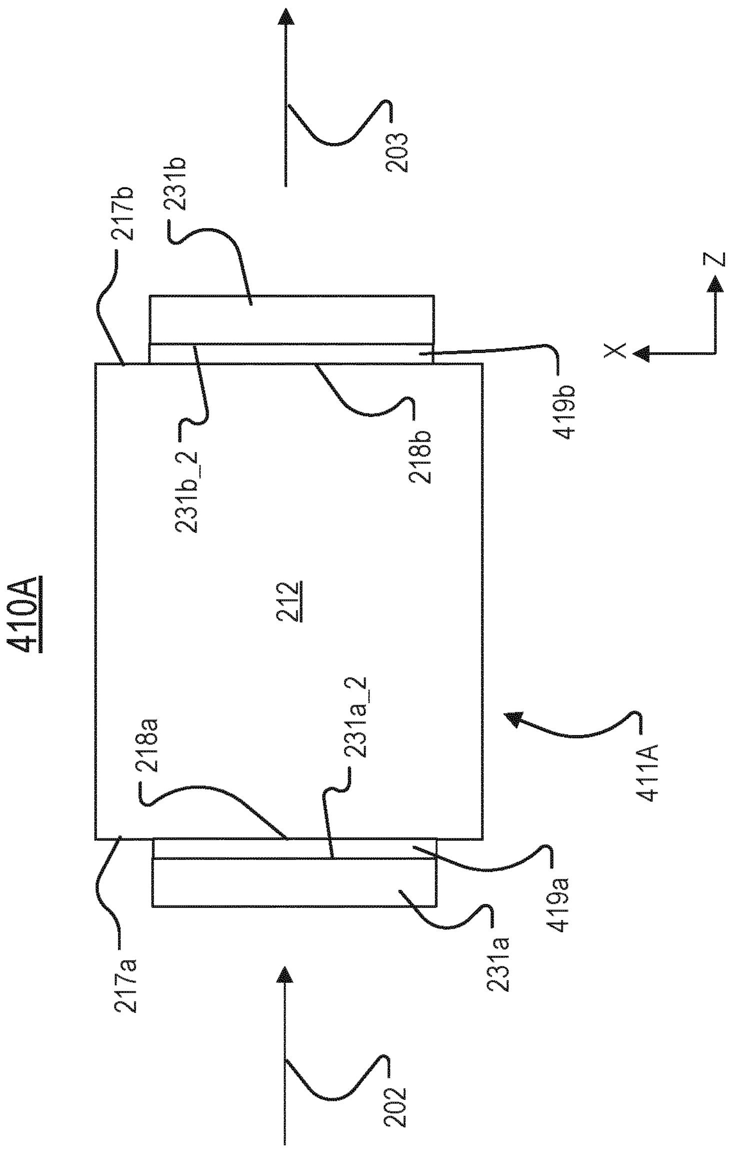
FIG. 4A is a block diagram of another implementation of an optical modulator.

Referring to FIG. 4A, a block diagram of an optical modulator 410A is shown. The optical modulator 410A is another implementation of the optical modulator 110 (FIG. 1). The optical modulator 410A includes a modulation assembly 411A. The optical modulator 410A is similar to the optical modulator 210 (FIGS. 2A-2C), except the modulation assembly 411A includes anti-reflection coatings 419*a* and 419*b*. The anti-reflection coating 419*a* is on the side 217*a* of the acousto-optic material 212 and is between the acousto-optic material 212 and the first thermally conductive material 231*a*. The anti-reflection coating 419*b* is on the side 217*b* of the acousto-optic material 212 and is between the acousto-optic material 212 and the second thermally conductive material 231*b*.

The anti-reflection coating 419*a*, 419*b* reduces or prevents reflections from the surface 231*a*_2 and the side 217*a* and the surface 231*b*_2 and the side 217*b*. The anti-reflection coatings 419*a*, 419*b* may be, for example, ion beam sputtering (IBS) layers. The anti-reflection coatings 419*a*, 419*b* may be referred to as an index matching material or an index matching layer. The light beam 202 also heats the anti-reflection coatings 419*a*, 419*b*. The thermally conductive material 231*a*, 231*b* are in thermal contact with the anti-reflection coatings 419*a*, 419*b* and draw excess heat from the anti-reflection coatings 419*a*, 419*b*. By removing excess heat from the anti-reflection coatings 419*a*, 419*b* or reducing excess heat in the anti-reflection coatings 419*a*, 419*b*, the thermally conductive materials 231*a*, 231*b* extend the lifetime and improve the performance of the anti-reflection coatings 419*a*, 419*b*.

As discussed above with respect to FIGS. 2A-2C, the thermally conductive materials 231*a*, 231*b* may be configured to act as anti-reflection coatings. In implementations in which the acousto-optic material 212 includes anti-reflection coatings (such as the example shown in FIG. 4A), the thermally conductive materials 213*a*, 214*b* may also be configured to act as anti-reflection coatings to further reduce unwanted reflections. However, in some implementations in which the acousto-optic material 212 includes anti-reflection coatings, the thermally conductive materials 213*a*, 213*b* are not configured to specifically act as anti-reflection coatings. Moreover, in implementations in which the thermally conductive materials 213*a* and 213*b* are configured to as anti-reflection coatings, the acousto-optic material 212 does not necessarily include the anti-reflection coatings 419*a*, 419*b* or any other anti-reflection coatings. In other words, the thermal management apparatus 230 may be configured such that additional anti-reflection coatings (such as the anti-reflection coatings 419*a*, 419*b*) are not necessary.

Figure 4B:
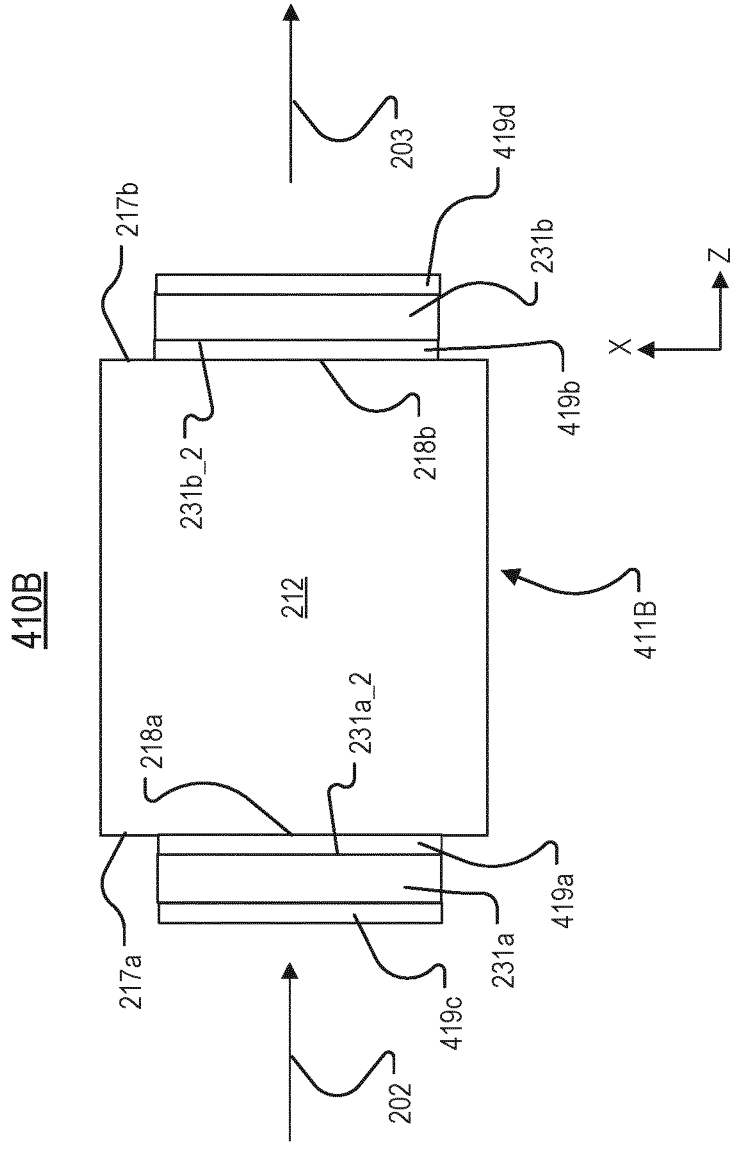
FIG. 4B is a block diagram of another implementation of an optical modulator.

FIG. 4B is a side block diagram of an optical modulator 410B, which includes a modulation assembly 411B. The optical modulator 410B and the modulation assembly 411B are the same as the optical modulator 410A and the modulation assembly 411A (FIG. 4A), except the modulation assembly 411B includes additional anti-reflection coatings 419*c* and 419*d*. The thermally conductive material 231*a* is between the anti-reflection coating 419*c* and the anti-reflection coating 419*a*, with the anti-reflection coating 419*c* receiving the input light beam 202 before the thermally conductive material 231*a* and the anti-reflection coating 419*a*. The thermally conductive material 231*b* is between the anti-reflection coating 419*b* and the anti-reflection coating 419*d*. The input light beam 202 is coupled into the thermally conductive material 231*a* by the anti-reflection coating 419*c*. The output beam 203 is coupled out of the thermally conductive material 231*b* by the anti-reflection coating 419*d*.

Figure 5:
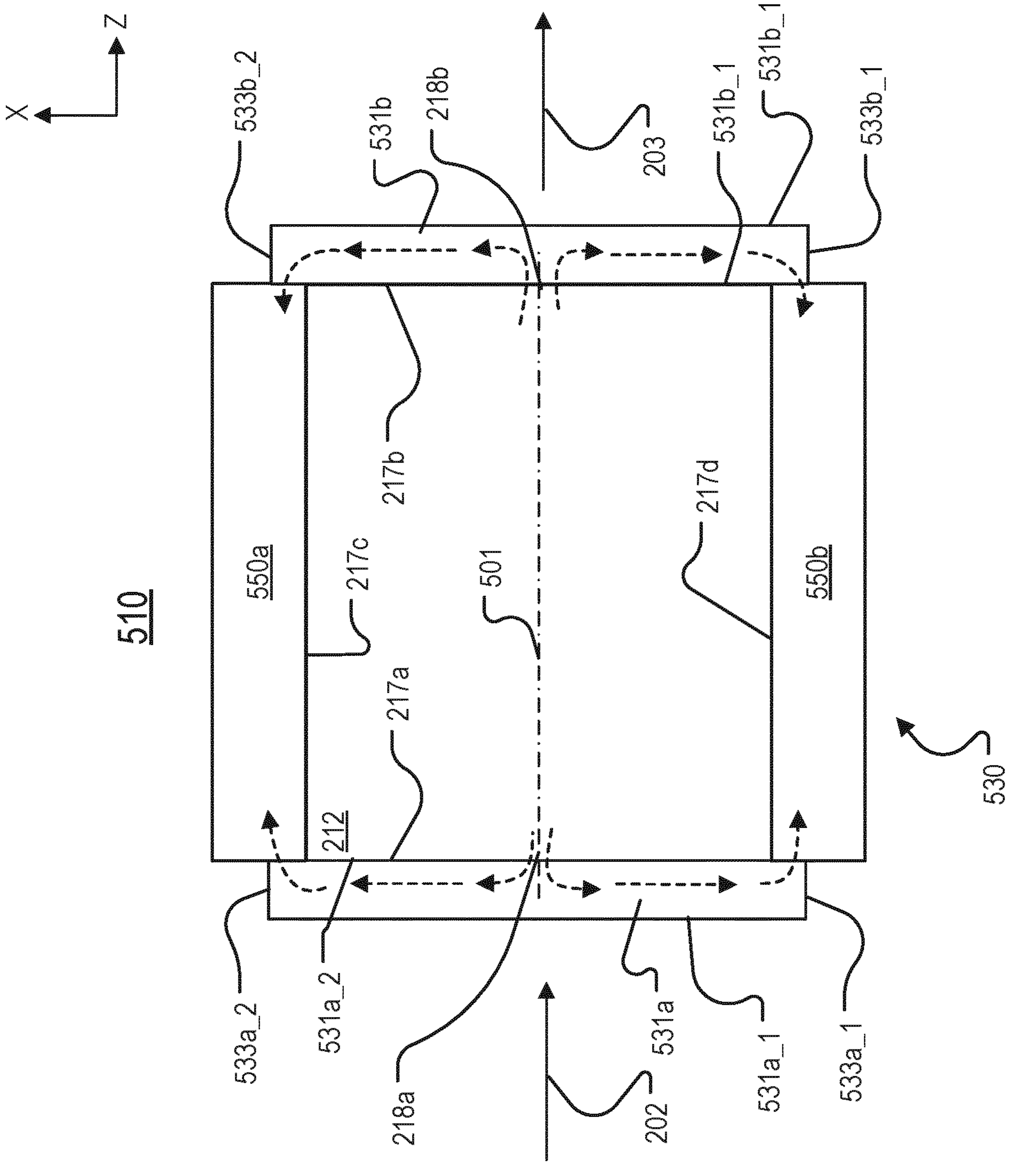
FIG. 5 is a block diagram of another implementation of an optical modulator.

Referring to FIG. 5, a side block diagram of an optical modulator 510 is shown. The modulator 510 is an implementation of the optical modulator 110 (FIG. 1). The optical modulator 510 includes the acousto-optic material 212 and a thermal management apparatus 530. The thermal management apparatus 530 includes a first thermally conductive material 531*a*, a second thermally conductive material 531*b*, and heat sinks 550*a*, 550*b*. The first thermally conductive material 531*a* is thermally coupled to the side 217*a* of the acousto-optic material 212. The second thermally conductive material 531*b* is thermally coupled to the side 217*b* of the acousto-optic material 212. In the example of FIG. 5, the first thermally conductive material 531*a* is held at the side 217*a* and the second thermally conductive material 531*b* is held at the side 217*b* by a Van der Waals force. No adhesive or clamp is used in the example of FIG. 5.

The first thermally conductive material 531*a* extends in the X direction from a first end 533*a*_1 to a second end 533*a*_2. The second thermally conductive material 531*b* extends in the X direction from a first end 533*b*_1 to a second end 533*b*_2. The first and second thermally conductive materials 531*a*, 531*b* are the same size and shape. The first and second thermally conductive materials 531*a*, 531*b* have a greater extent in the X direction than the acousto-optic material 212.

The heat sink 550*a* is attached to the side 217*c* of the acousto-optic material 212. The heat sink 550*a* is thermally coupled to the ends 533*a*_2 and 533*b*_2. The heat sink 550*b* is attached to the side 217*d* of the acousto-optic material 212. The heat sink 550*b* is thermally coupled to the ends 533*a*_1 and 533*b*_1. The heat sink 550*a*, the thermally conductive material 531*a*, the thermally conductive material 531*b*, and the heat sink 550*b* are thermally coupled to each other and to the acousto-optic material 212.

The heat sinks 550*a* and 550*b* are made of a material with a high thermal conductivity that dissipates heat more readily than the acousto-optic material 212, the thermally conductive material 531*a*, and the thermally conductive material 531*b*. The heat sinks 550*a*, 550*b* are not in the path of the input beam 202. Accordingly, the heat sinks 550*a*, 550*b* may be made of a material that does not transmit the wavelength or wavelengths of the input beam 202. The heat sinks 550*a* and 550*b* may be made of, for example, copper. In some implementations, the heat sinks 550*a*, 550*b* are water-cooled to increase the heat dissipation ability of the heat sinks 550*a*, 550*b*. In some implementations, the optical modulator 510 includes a housing, and the heat sinks 550*a*, 550*b* are part of the housing.

The flow of heat in the optical modulator 510 is discussed next. In operational use, the input beam 202 is incident on the first thermally conductive material 531*a*. The input beam 202 passes through the first thermally conductive material 531*a* and enters the acousto-optic material 212 at the region 218*a*. The input beam 202 passes through the acousto-optic material 212 on a path 501. The path 501 (which is generally along the Z direction in this example) is shown with a dash-dot line in the example of FIG. 5. Other paths through the acousto-optic material 212 are possible. The output beam 203 exits the acousto-optic material 212 through the region 218*b* and passes through the second thermally conductive material 531*b* and then exits the optical modulator 510.

The flow of heat in the optical modulator 510 is shown with dashed arrows. Heat is deposited in the acousto-optic material 212 from the interaction between the material 212 and the light. Heat may accumulate at the regions 218*a* and 218*b*, and within a bulk region of the material 212 that is between the regions 218*a* and 218*b*. The heat is removed from the acousto-optic material 212 though the regions 218*a* and 218*b*. The heat sinks 550*a* and 550*b* have a higher thermal conductivity than the first and second thermally conductive materials 531*a* and 531*b*. Thus, heat flows from the regions 218*a* and 218*b*, into the thermally conductive materials 531*a*, 531*b*, and into to the heat sinks 550*a* and 550*b*. Heat in the acousto-optic material 212 also may be removed through the sides 217*c* and 217*d*. The heat sinks 550*a* and 550*b* dissipate the heat. Thus, the thermal management apparatus 530 removes heat from the acousto-optic material 212, thereby preventing or mitigating thermal damage to the acousto-optic material 212.

Figure 6:
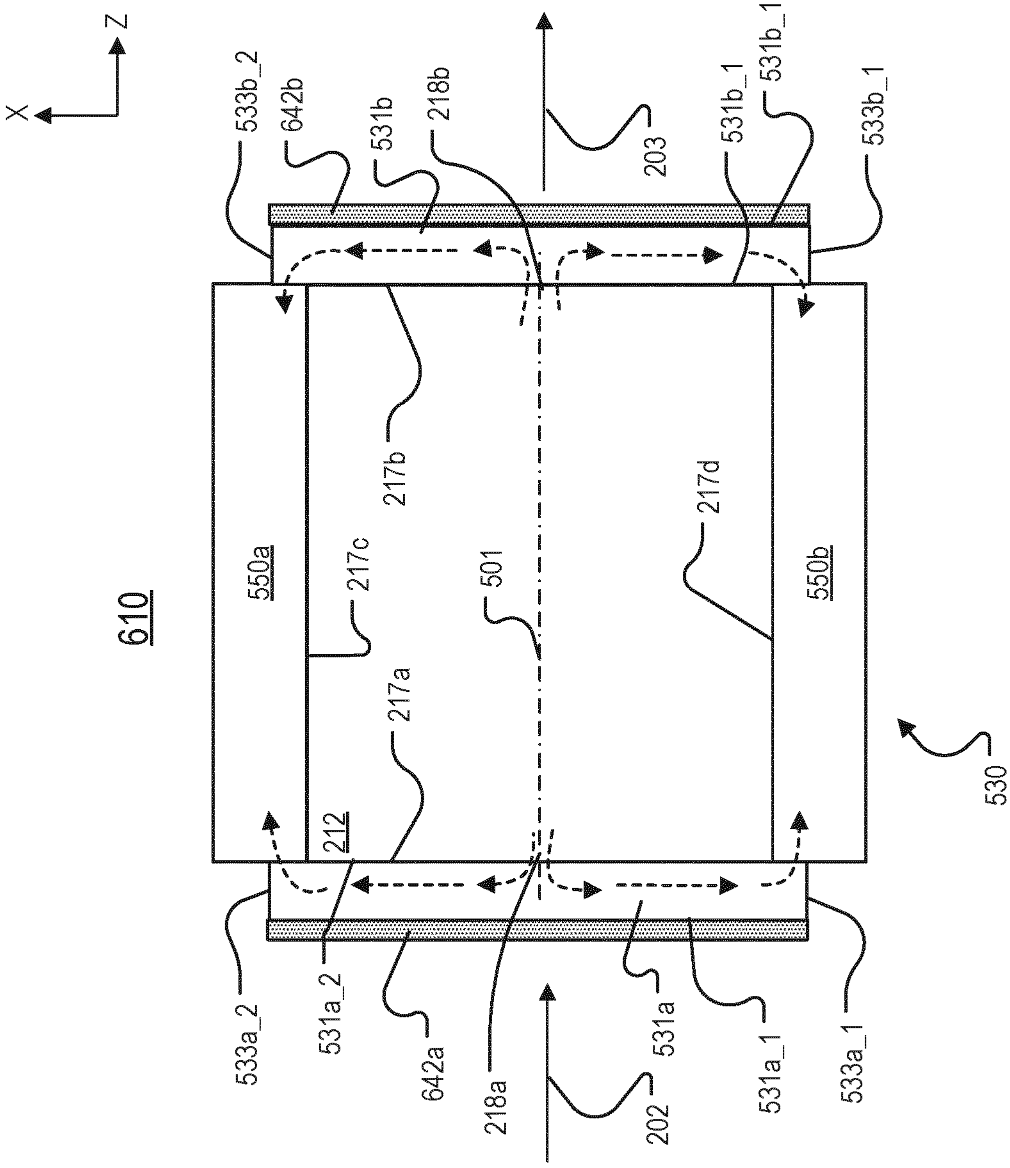
FIG. 6 is a block diagram of another implementation of an optical modulator.

Referring to FIG. 6, a side block diagram of an optical modulator 610 is shown. The optical modulator 610 is another implementation of the optical modulator 110 (FIG. 1). The optical modulator 610 is the same as the optical modulator 510 (FIG. 5), except the optical modulator 610 includes structures 642*a* and 642*b*. The structures 642*a* and 642*b* act as anti-reflection coatings. The structures 642*a* and 642*b* may be meta-structures that are formed on and are part of the thermally conductive materials 531*a* and 531*b*, respectively. A meta-structure is a structure that is formed from components that have a size than is less than the wavelength of incident light. The arrangement of the sub-wavelength components causes incident light to interfere in a manner that results in little to no reflection of the incident light. The structures 642*a*, 642*b* may be moth-eye optical elements. In this way, the meta-structures 642*a* and 642*b* act as an anti-reflection coating. The structure 642*a* is on the thermally conductive material 531*a* and faces the input light beam 202. In other words, the thermally conductive material 531*a* is between the structure 642*a* and the side 217*a*. The structure 642*b* is on the thermally conductive material 531*b*. The thermally conductive material 531*b* is between the structure 642*b* and the side 217*b*.

Figure 7B:
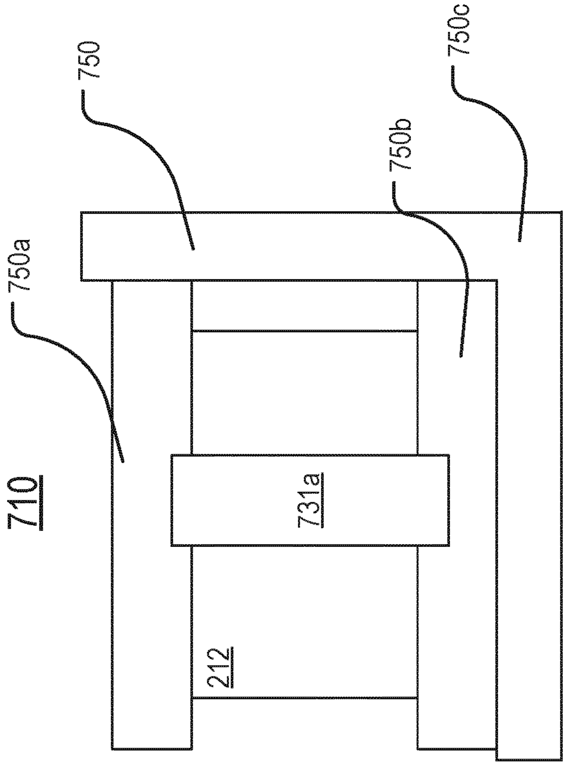
FIGS. 7A and 7B are two views of another implementation of an optical modulator.
Figure 7A:
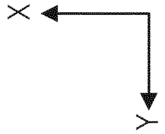
Figure 7A:
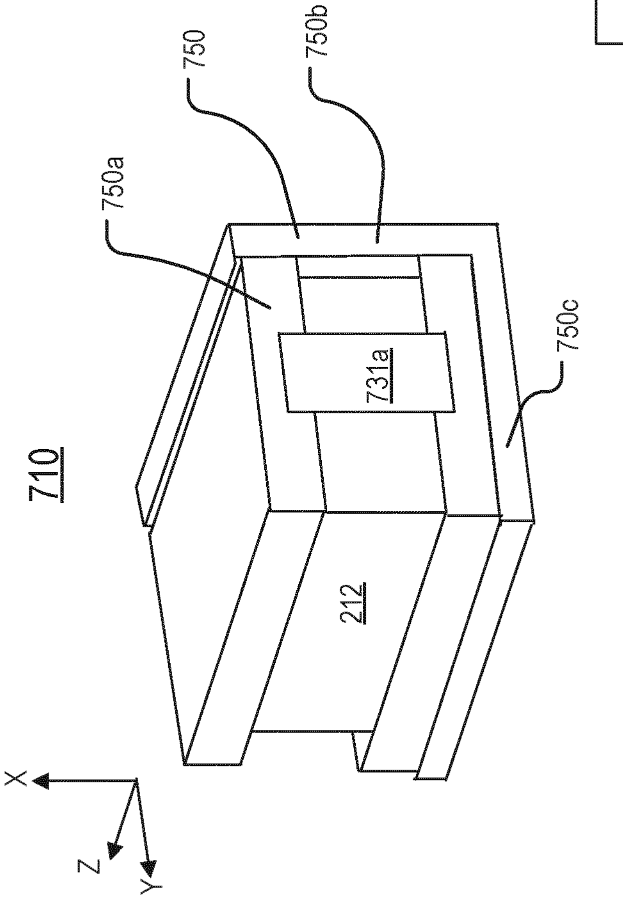

Referring to FIGS. 7A and 7B, a block diagram of an optical modulator 710 is shown. The optical modulator 710 an implementation of the optical modulator 110 (FIG. 1). FIG. 7A is a perspective view of the optical modulator 710. FIG. 7B is a block diagram of the optical modulator 710 in the X-Y plane. The optical modulator 710 includes a heat sink 750, which includes segments 750*a*, 750*b*, and 750*c*. The segments 750*a*, 750*b*, and 750*c* are in physical contact and form single, unitary piece. The segments 750*a*, 750*b*, 750*c* are positioned at three sides of the acousto-optic material 212. The segments 750*a*, 750*b*, 750*c* are made of a thermally conductive material, such as copper.

The optical modulator 710 also includes a thermally conductive material 731*a*, which is thermally coupled to the heat sink 750. The thermally conductive material 731*a* has a higher thermal conductivity than the acousto-optic material 212 and a similar or lower thermal conductivity than the heat sink 750. The thermally conductive material 731*a* may be, for example, diamond.

Figure 8A:
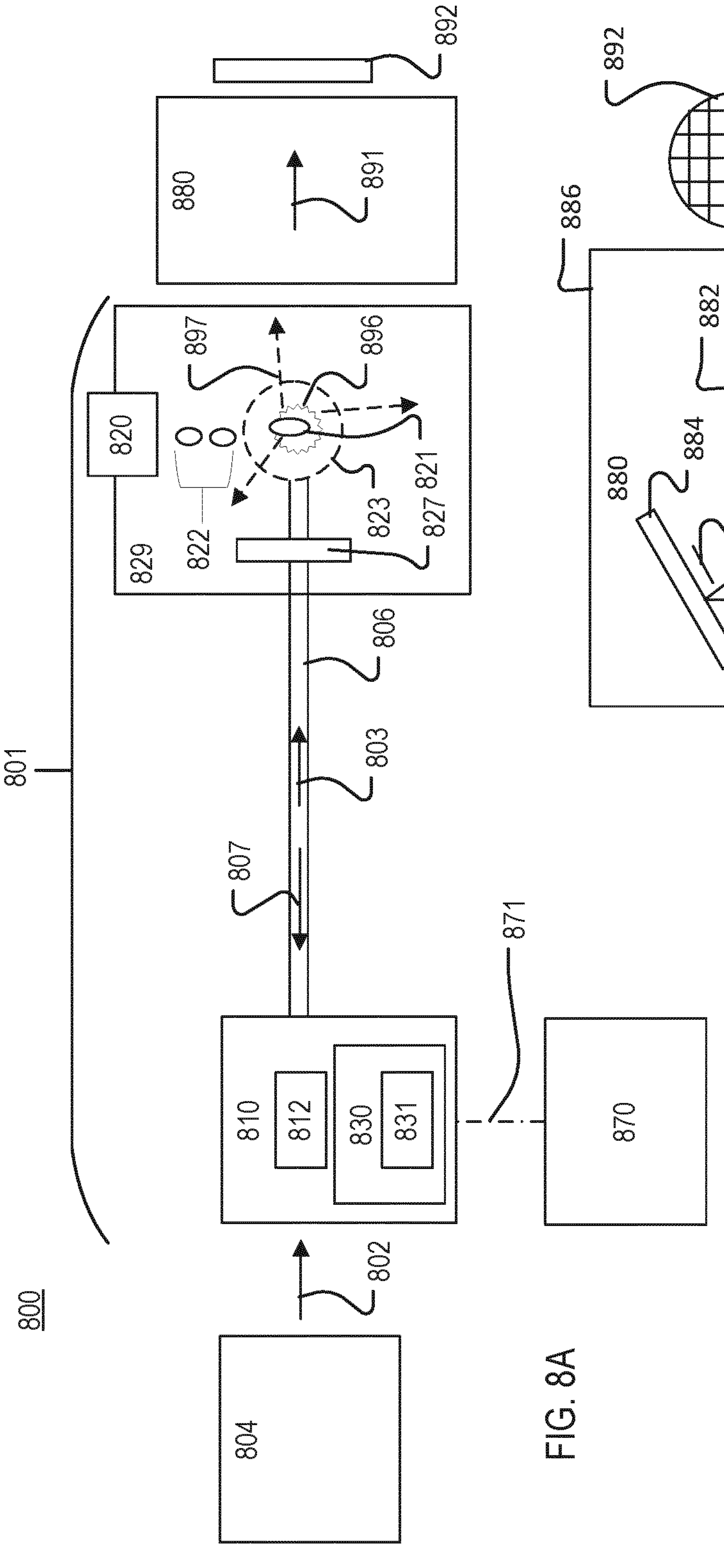
FIG. 8A shows an implementation of an extreme ultraviolet (EUV) lithography system.

FIG. 8A is a block diagram of an EUV lithography system 800 that includes an optical modulator 810. Any of the optical modulators 110, 210, 310A, 310B, 410A, 510, 610, and 710 may be used as the optical modulator 810. The optical modulator 810 includes an acousto-optic material 812 and a thermal management apparatus 830. The acousto-optic material 812 is similar to the acousto-optic material 212. The thermal management apparatus 830 is similar to any of the thermal management apparatuses discussed above. The thermal management apparatus 830 enables the optical modulator 810 to be used more effectively and for a longer period of time as compared to an optical modulator that does not have the thermal management apparatus 830.

The lithography system 800 includes an EUV light source 801, which provides EUV light 897 to a lithography apparatus 880. Extreme ultraviolet ("EUV") light is, for example, electromagnetic radiation having wavelengths of 100 nanometers (nm) or less (also sometimes referred to as soft x-rays), and including light at a wavelength of, for example, 20 nm or less, between 5 and 20 nm, or between 13 and 14 nm. The lithography apparatus 880 shapes, controls, directs, and/or focuses the EUV light 897 into exposure beam 891. The exposure beam 891 impinges on a substrate 892 to form microelectronic features at the substrate 892.

The optical modulator 810 interacts with a light beam 802 produced by an optical source 804 to generate an output beam 803. The thermal management apparatus 830 allows the optical modulator 810 to be used effectively in a system that includes propagating light of high powers, such as the EUV light source 801. The beam 802 may be a high-power (for example, tens or hundreds of Watts (W)) beam of light with a wavelength in the long-wave (LW) infrared region (for example, 9-12 microns (μm), 9-11 μm, 10-11 μm, 10.26 μm, 10.19 μm-10.26 μm or 10.59 μm). The optical source 804 may be, for example, a pulsed (for example, a Q-switched) or continuous-wave carbon dioxide ($CO_2$) laser. The optical modulator 810 also may interact with a reflection 807. The reflection 807 arises when the light beam 803 reflects from target material or a downstream optical element.

For implementations in which the light beam 802 (and the reflection 807) include light having a wavelength of 10.6 microns (μm), the acousto-optic material 812 may be, for example, germanium (Ge). The thermal management apparatus 830 includes a thermally conductive material 831. The thermally conductive material 831 is similar to the thermally conductive materials 231*a*, 231*b*, 531*a*, and/or 531*b* discussed above. The thermal management apparatus 830 may include more than one thermally conductive material. The thermally conductive material 831 is at least partially transmissive to the wavelength or wavelengths in the light beam 802 and the reflection 807. For example, in implementations in which the light beam 802 and the reflection 807 include light having wavelengths between 9 μm and 11 μm, the thermally conductive material 831 may be diamond or other suitable thermally conductive materials. Moreover, the thermally conductive material 831 may include a meta-structure such as the structures 642*a* and 642*b* of FIG. 6.

The EUV light source 802 includes a supply system 820 that produces a stream 822 of targets. The targets in the stream 822 travel in a vacuum chamber 829 toward the plasma formation region 823. In the example of FIG. 8A, a target 821 (which is part of the stream 222) is in the plasma formation region 823. Each target in the stream 822 includes target material, which is any material that emits EUV light when in a plasma state. For example, the target material may include water, tin, lithium, and/or xenon. Other materials may be used as the target material. For example, the element tin may be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. Moreover, the target material may be a target mixture that includes impurities that do not emit EUV light in a plasma state, such as non-target particles or inclusion particles. The non-target particles or inclusion particles may be, for example, particles of tin oxide ($SnO_2$) or particles of tungsten (W).

An interaction between the output light beam 803 and the target 221 produces the plasma 896, which emits the EUV light 897. The interaction also may produce the reflection 807. The EUV light 897 interacts with an optical element 213, which directs at least some of the EUV light 897 to the lithography apparatus 880. The optical element 827 may be a collector mirror that has an aperture through which the output light beam 803 propagates and a curved reflective surface faces the plasma formation region 823 and reflects and focuses wavelengths in the EUV range.

In some implementations, the optical source 804 includes more than one optical source and produces the light beam 802 and a second, distinct light beam that has different properties than the light beam 802. For example, the two distinct light beams may have different spectral properties (for example, different center wavelengths and/or different spectral bandwidths) and/or different average and/or peak power. In some implementations, the optical source 804 may include a second laser that emits a second light beam that has a wavelength of about 1 μm, such as, for example, a solid-state laser (for example, Nd:YAG laser or an erbium-doped fiber (Er:glass) laser). In other implementations, the optical source 804 includes a second source that is identical to the source that produces the high-powered light beam 802.

The second light beam may be used to condition the target 821 such that the production of EUV light is enhanced. For example, the interaction between the second light beam and a target in the stream 822 may change the shape, volume, and/or size of the distribution of the target material in the target in the stream 822 and/or may reduce the density gradient of the target material along the direction of propagation of the second light beam before the target interacts with the output beam 803. All of these changes enhance the ability of the target to absorb optical energy from the output light beam 803 and increase the amount of target material converted into the plasma 896.

The system 800 also includes a control system 870 that is coupled to the optical modulator 810 via a communication link 871 (shown with a dashed-dot line style). The data link 871 may be any type of medium that is capable of carrying information. For example, the data link may be an electrical cable, optical fiber, and/or a wireless connection. The control system 870 controls the optical modulator 810. For example, the control system 870 may control how the optical modulator 810 modulates an input beam 802 a transducer such as the transducer 116 (FIG. 1). In some implementations, the thermal management apparatus 830 includes a water-cooled heat sink. In these implementations, the control system 870 also may control the water-cooled heat sink.

Figure 8B:
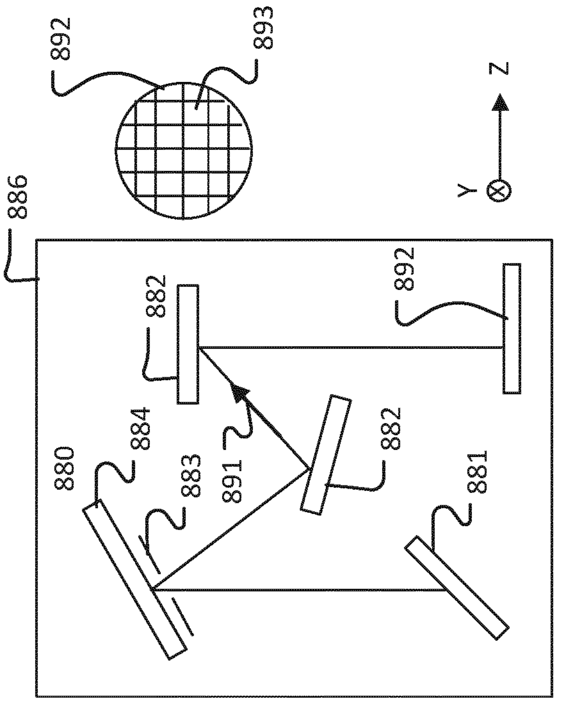
FIG. 8B shows an implementation of a lithography apparatus.

Referring also to FIG. 8B, the lithography apparatus 880 includes a plurality of reflective optical elements 881 and 882, a mask 884, and a slit 883, all of which are in an enclosure 886. The enclosure 886 is a housing, tank, or other structure that is capable of supporting the reflective optical elements 881 and 882, the mask 884, and the slit 883, and is also capable of maintaining an evacuated space within the enclosure 886.

The EUV light 897 enters the enclosure 886 and is reflected by the optical element 881 through the slit 883 toward the mask 884. The slit 883 is the shape of the distributed light used to scan a wafer in a lithography process. The size of the slit 883 is a physical quantity. The dose delivered to the substrate 892 or the number of photons delivered to the substrate 892 depends on the size of the slit 883 and the speed at which the slit 883 is scanned.

The mask 884 also may be referred to as a reticle or patterning device. The mask 884 includes a spatial pattern that represents the electronic features that are to be formed on a substrate 892. The EUV light 897 interacts with the mask 884. The interaction between the EUV light 897 and the mask 884 results in the pattern of the mask 884 being imparted onto the EUV light 897 to form the exposure beam 891. The exposure beam 891 passes through the slit 883 and is directed to the substrate 892 by the optical elements 882. An interaction between the substrate 892 and the exposure beam 891 exposes the pattern of the mask 884 onto the substrate 892, and the electronic features are thereby formed at the substrate 892. The substrate 892 includes a plurality of portions 893 (for example, dies). The area of each portion 893 in the Y-Z plane is less than the area of the entire substrate 892 in the Y-Z plane. Each portion 893 may be exposed by the exposure beam 891 to include a copy of the mask 884 such that each portion 893 includes the electronic features indicated by the pattern on the mask 884.

Figure 9:
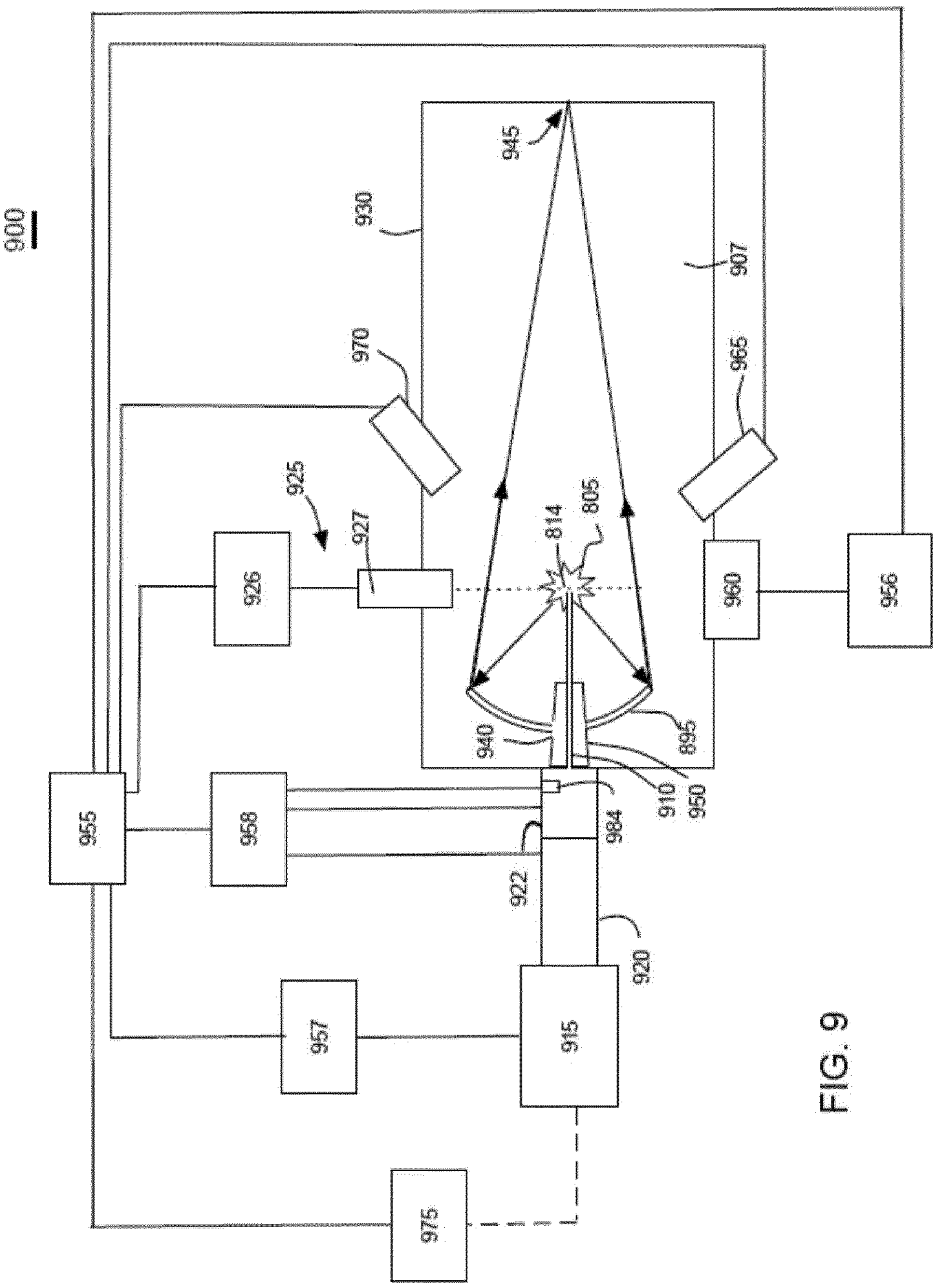
FIG. 9 shows an implementation of an EUV light source.

Referring to FIG. 9, an implementation of an LPP EUV light source 900 is shown. Any of the optical modulators 110, 210, 310A, 310B, 410A, 510, 610, 710, and 810 may be used in the EUV light source 900. The optical modulator may be used to protect elements from back reflections that arise from light interacting with target material and/or optical elements, and/or to control a forward-going light beam that irradiates the target material. For example, any of the optical modulators 110, 210, 310A, 310B, 410A, 510, 610, 710, and 810 may be placed between a drive laser 915 and a beam transport system 920, or between the drive laser 915 and an optical amplifier that receives light from the drive laser 915. Moreover any of the optical modulators 110, 210, 310A, 310B, 410A, 510, 610, 710, and 810 may be positioned between two optical amplifiers. Further details of the EUV light source 900 are provided below.

The LPP EUV light source 900 is formed by irradiating a target mixture 914 at a plasma formation region 905 with an amplified light beam 910 that travels along a beam path toward the target mixture 914. The target material discussed with respect to FIG. 8A and the targets in the stream 822 discussed with respect to FIG. 8A may be or include the target mixture 914. The plasma formation region 905 is within an interior 907 of a vacuum chamber 930. When the amplified light beam 910 strikes the target mixture 914, a target material within the target mixture 914 is converted into a plasma state that has an element with an emission line in the EUV range. The created plasma has certain characteristics that depend on the composition of the target material within the target mixture 914. These characteristics may include the wavelength of the EUV light produced by the plasma and the type and amount of debris released from the plasma.

The light source 900 includes a drive laser system 915 that produces the amplified light beam 910 due to a population inversion within the gain medium or mediums of the laser system 915. The light source 900 includes a beam delivery system between the laser system 915 and the plasma formation region 905, the beam delivery system including a beam transport system 920 and a focus assembly 922. The beam transport system 920 receives the amplified light beam 910 from the laser system 915, and steers and modifies the amplified light beam 910 as needed and outputs the amplified light beam 910 to the focus assembly 922. The focus assembly 922 receives the amplified light beam 910 and focuses the beam 910 to the plasma formation region 905.

In some implementations, the laser system 915 may include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 915 produces an amplified light beam 910 due to the population inversion in the gain media of the laser amplifiers even if there is no laser cavity. Moreover, the laser system 915 may produce an amplified light beam 910 that is a coherent laser beam if there is a laser cavity to provide enough feedback to the laser system 915. The term "amplified light beam" encompasses one or more of: light from the laser system 915 that is merely amplified but not necessarily a coherent laser oscillation and light from the laser system 915 that is amplified and is also a coherent laser oscillation.

The optical amplifiers in the laser system 915 may include as a gain medium a filling gas that includes $CO_2$ and may amplify light at a wavelength of between about 9100 and about 11000 nm, and in particular, at about 10600 nm, at a gain greater than or equal to 900 times. Suitable amplifiers and lasers for use in the laser system 915 may include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 40 kHz or more. The pulse repetition rate may be, for example, 50 kHz. The optical amplifiers in the laser system 915 may also include a cooling system such as water that may be used when operating the laser system 915 at higher powers.

The light source 900 includes a collector mirror 935 having an aperture 940 to allow the amplified light beam 910 to pass through and reach the plasma formation region 905. The collector mirror 935 may be, for example, an ellipsoidal mirror that has a primary focus at the plasma formation region 905 and a secondary focus at an intermediate location 945 (also called an intermediate focus) where the EUV light may be output from the light source 900 and may be input to, for example, an integrated circuit lithography tool (not shown). The light source 900 may also include an open-ended, hollow conical shroud 950 (for example, a gas cone) that tapers toward the plasma formation region 905 from the collector mirror 935 to reduce the amount of plasma-generated debris that enters the focus assembly 922 and/or the beam transport system 920 while allowing the amplified light beam 910 to reach the plasma formation region 905. For this purpose, a gas flow may be provided in the shroud that is directed toward the plasma formation region 905.

The light source 900 may also include a master controller 955 that is connected to a droplet position detection feedback system 956, a laser control system 957, and a beam control system 958. The light source 900 may include one or more target or droplet imagers 960 that provide an output indicative of the position of a droplet, for example, relative to the plasma formation region 905 and provide this output to the droplet position detection feedback system 956, which may, for example, compute a droplet position and trajectory from which a droplet position error may be computed either on a droplet by droplet basis or on average. The droplet position detection feedback system 956 thus provides the droplet position error as an input to the master controller 955. The master controller 955 may therefore provide a laser position, direction, and timing correction signal, for example, to the laser control system 957 that may be used, for example, to control the laser timing circuit and/or to the beam control system 958 to control an amplified light beam position and shaping of the beam transport system 920 to change the location and/or focal power of the beam focal spot within the chamber 930.

The supply system 925 includes a target material delivery control system 926 that is operable, in response to a signal from the master controller 955, for example, to modify the release point of the droplets as released by a target material supply apparatus 927 to correct for errors in the droplets arriving at the desired plasma formation region 905.

Additionally, the light source 900 may include light source detectors 965 and 970 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 965 generates a feedback signal for use by the master controller 955. The feedback signal may be, for example, indicative of the errors in parameters such as the timing and focus of the laser pulses to properly intercept the droplets in the right place and time for effective and efficient EUV light production.

The light source 900 may also include a guide laser 975 that may be used to align various sections of the light source 900 or to assist in steering the amplified light beam 910 to the plasma formation region 705. In connection with the guide laser 975, the light source 900 includes a metrology system 924 that is placed within the focus assembly 922 to sample a portion of light from the guide laser 975 and the amplified light beam 910. In other implementations, the metrology system 924 is placed within the beam transport system 920. The metrology system 924 may include an optical element that samples or re-directs a subset of the light, such optical element being made out of any material that may withstand the powers of the guide laser beam and the amplified light beam 910. A beam analysis system is formed from the metrology system 924 and the master controller 955 since the master controller 955 analyzes the sampled light from the guide laser 975 and uses this information to adjust components within the focus assembly 922 through the beam control system 958.

Thus, in summary, the light source 900 produces an amplified light beam 910 that is directed along the beam path to irradiate the target mixture 914 at the plasma formation region 905 to convert the target material within the mixture 914 into plasma that emits light in the EUV range. The amplified light beam 910 operates at a particular wavelength (that is also referred to as a drive laser wavelength) that is determined based on the design and properties of the laser system 915. Additionally, the amplified light beam 910 may be a laser beam when the target material provides enough feedback back into the laser system 915 to produce coherent laser light or if the drive laser system 915 includes suitable optical feedback to form a laser cavity.

Other aspects of the invention are set out in the following numbered clauses

1. An optical modulator comprising:
   - an acousto-optic assembly comprising:
   - an acousto-optic material;
   - a first side configured to receive an incident light beam; and
   - a second side configured to emit an output light beam based on the incident light beam; and a thermal management apparatus comprising:
   - a first thermally conductive material in thermal contact with the first side of the acousto-optic assembly; and
   - a second thermally conductive material in thermal contact with the second side of the acousto-optic assembly.
2. The optical modulator of clause 1, wherein, the first side of the acousto-optic assembly comprises a first side of the acousto-optic material, the second side of the acousto-optic assembly comprises a second side of the acousto-optic material, the first thermally conductive material is in thermal contact with the first side of the acousto-optic material, and the second thermally conductive material is in in thermal contact with the second side of the acousto-optic material.
3. The optical modulator of clause 1, wherein the first thermally conductive material has a first thickness along a direction of propagation of an incident pulsed light beam, and the first thickness is an integer multiple of one-fourth of a wavelength of the incident pulsed light beam; and the second thermally conductive material has a second thickness along a direction of propagation of the incident pulsed light beam, and the second thickness is an integer multiple of one-fourth of a wavelength of the pulsed light beam.
4. The optical modulator of clause 1, wherein the thermal management apparatus further comprises a heat sink in thermal contact with the first thermally conductive material and the second thermally conductive material.
5. The optical modulator of clause 4, wherein the acousto-optic material comprises:
   - a first side;
   - a second side;
   - a third side; and
   - a fourth side, and
   - the heat sink is attached to the third side or the fourth side.
6. The optical modulator of clause 5, wherein the heat sink comprises a first heat sink portion and a second heat sink portion, the first heat sink portion is attached to the third side of the acousto-optic material, and the second heat sink portion is attached to the fourth side of the acousto-optic material.
7. The optical modulator of clause 6, wherein the heat sink comprises a water-cooled metal block.
8. The optical modulator of clause 7, wherein the metal block comprises copper.
9. The optical modulator of clause 1, wherein the first thermally conductive material comprises diamond and the second thermally conductive material comprises diamond.
10. The optical modulator of clause 1, further comprising: a first index matching material between the acousto-optic material and the first thermally conductive material, and a second index matching material between the acousto-optic material and the second thermally conductive material.
11. The optical modulator of clause 2, wherein the first thermally conductive material is attached to the first side by a Van der Waals force, and the second thermally conductive material is attached to the second side by a Van der Waals force.
12. The optical modulator of clause 1, wherein the first thermally conductive material is attached to the first side of the acousto-optic assembly by an adhesive or a mechanical clamp, and the second thermally conductive material is attached to the second side of the acousto-optic assembly by an adhesive or a mechanical clamp.
13. The optical modulator of clause 12, wherein the acousto-optic assembly further comprises a first anti-reflection between the first thermally conductive material and the acousto-optic material, and a second anti-reflection between the second thermally conductive material and the acousto-optic material, the first thermally conductive material is in thermal contact with the first side of the acousto-optic assembly by being attached first anti-reflection coating, and the second thermally conductive material is in thermal contact with the second side of the acousto-optic assembly by being attached to the second anti-reflection coating.
14. The optical modulator of clause 13, wherein at least one of the first anti-reflection coating and the second anti-reflection coating are an ion beam sputtering (IBS) layer.
15. The optical modulator of clause 1, wherein the acousto-optic assembly further comprises a first structure at the first side, a second structure at the second side, the first structure is configured to reduce reflection of the incident light beam, and the second structure is configured to reduce reflection of the incident light beam.
16. The optical modulator of clause 15, wherein the first structure comprises a first moth-eye optic, and the second structure comprises a second moth-eye optic.
17. The optical modulator of clause 1, wherein the acousto-optic material comprises germanium (Ge) or gallium arsenide (GaAs).
18. The optical modulator of clause 1, wherein one or more of the first thermally conductive material and the second thermally conductive material transmit wavelengths between 9 microns (μm) and 11 μm.
19. The optical modulator of clause 1, wherein the first thermally conductive material has a an extent that is less than the extent of the acousto-optic material in at least one direction, or the second thermally conductive has an extent that is less than the extent of the acousto-optic material in at least one direction.
20. The optical modulator of clause 1, wherein the first thermally conductive material and the second thermally conductive material are polycrystalline diamond or monocrystalline diamond.

21. The optical modulator of clause 1, wherein the first thermally conductive material and the second thermally conductive material have a surface roughness of less than 5 nanometers (nm).

22. An extreme ultraviolet (EUV) light source comprising:
an optical source configured to emit a pulsed light beam onto a beam path;
an optical modulator comprising:
a modulation assembly comprising:
an acousto-optic material on the beam path, the acousto-optic material having an index of refraction that varies based on an applied acoustic signal;
a first side configured to receive the pulsed light beam from the optical source; and
a second side configured to emit an output light beam based on the pulsed light beam; and
a thermal management apparatus comprising:
a first thermally conductive material in thermal contact with the first side of the modulation assembly; and
a second thermally conductive material in thermal contact with the second side of the modulation assembly; and
a vacuum chamber comprising an interior configured to receive the output light beam at a target region.

23. The EUV light source of clause 22, wherein:
the first thermally conductive material has a first thickness along a direction of propagation of the pulsed light beam, and the first thickness is an integer multiple of one-fourth of a wavelength of the pulsed light beam; and
the second thermally conductive material has a second thickness along a direction of propagation of the pulsed light beam, and the second thickness is an integer multiple of one-fourth of a wavelength of the pulsed light beam.

24. The EUV light source of clause 22, wherein:
the first thermally conductive material has a first thickness along a direction of propagation of the pulsed light beam, and the first thickness is one quarter more than an integer multiple of a half wavelength of the pulsed light beam.

25. The EUV light source of clause 22, wherein the pulsed light beam has a wavelength between 9 microns (μm) and 11 μm.

26. The EUV light source of clause 22, wherein the thermal management apparatus further comprises a heat sink in thermal contact with the first thermally conductive material and the second thermally conductive material.

27. The EUV light source of clause 22, wherein
the acousto-optic material comprises:
a first side;
a second side;
a third side; and
a fourth side, and
the heat sink is attached to the third side or the fourth side.

28. The EUV light source of clause 27, wherein the heat sink comprises a first heat sink portion and a second heat sink portion, the first heat sink portion is attached to the third side of the acousto-optic material, and the second heat sink portion is attached to the fourth side of the acousto-optic material.

29. The EUV light source of clause 22, wherein the first thermally conductive material is attached to the acousto-optic material by a Van der Waals force, and the second thermally conductive material is attached to the acousto-optic material by a Van der Waals force.

30. The EUV light source of clause 22, wherein the modulation assembly further comprises a first anti-reflection coating on the acousto-optic material, the first anti-reflection coating is between the acousto-optic material and the first thermally conductive material, a second anti-reflection coating on the acousto-optic material, and the second anti-reflection coating is between the acousto-optic material and the second thermally conductive material.

31. The EUV light source of clause 22, wherein the acousto-optic material further comprises a first structure at the first side, a second structure at the second side, the first structure is configured to reduce reflection of the incident light beam, and the second structure is configured to reduce reflection of the incident light beam.

32. The EUV light source of clause 22, wherein the first thermally conductive material has an extent that is less than the extent of the acousto-optic material in at least one direction, or the second thermally conductive material has an extent that is less than the extent of the acousto-optic material in at least one direction.

33. The EUV light source of clause 22, wherein the first thermally conductive material has an extent that is less than the extent of the acousto-optic material in at least one direction, and the second thermally conductive material has an extent that is less than the extent of the acousto-optic material in at least one direction.

34. An optical modulator comprising:
an optical assembly comprising:
an optical material;
a first side configured to receive an incident light beam; and
a second side configured to emit an output light beam based on the incident light beam; and
a thermal management apparatus comprising:
a first thermally conductive material in thermal contact with the first side of the optical assembly.

35. The optical modulator of clause 34, wherein the optical material comprises an electro-optic material.

36. The optical modulator of clause 35, wherein the optical material comprises cadmium telluride (CdTe) or cadmium Zinc Telluride (CZT).

Other implementations are within the scope of the claims.

The invention claimed is:

1. An optical modulator comprising:
an acousto-optic assembly comprising:
an acousto-optic material;
a first side configured to receive an incident light beam; and
a second side configured to emit an output light beam based on the incident light beam; and
a thermal management apparatus comprising:
a first thermally conductive material in thermal contact with the first side of the acousto-optic assembly, wherein the first side of the acousto-optic assembly comprises a first side of the acousto-optic material and the first thermally conductive material is in thermal contact with the first side of the acousto-optic material; and
a second thermally conductive material in thermal contact with the second side of the acousto-optic assembly, wherein the second side of the acousto-optic assembly comprises a second side of the acousto-optic material and the second thermally conductive material is in thermal contact with the second side of the acousto-optic material; and
wherein the optical modulator further comprises an anti-reflection coating on at least two sides of each of the first thermally conductive material and the second thermally conductive material.

2. The optical modulator of claim 1, wherein the first thermally conductive material has a first thickness along a direction of propagation of an incident pulsed light beam, and the first thickness is an integer multiple of one-fourth of a wavelength of the incident pulsed light beam; and the second thermally conductive material has a second thickness along a direction of propagation of the incident pulsed light beam, and the second thickness is an integer multiple of one-fourth of a wavelength of the incident pulsed light beam.

3. The optical modulator of claim 1, wherein the thermal management apparatus further comprises a heat sink in thermal contact with the first thermally conductive material and the second thermally conductive material.

4. The optical modulator of claim 3, wherein the acousto-optic material further comprises:

a third side; and a fourth side, and the heat sink is attached to the third side or the fourth side, wherein the heat sink comprises a first heat sink portion and a second heat sink portion, the first heat sink portion is attached to the third side of the acousto-optic material, and the second heat sink portion is attached to the fourth side of the acousto-optic material.

5. The optical modulator of claim 1, further comprising: a first index matching material between the acousto-optic material and the first thermally conductive material, and a second index matching material between the acousto-optic material and the second thermally conductive material.

6. The optical modulator of claim 1, wherein the first thermally conductive material is attached to the first side of the acousto-optic material by an adhesive or a mechanical clamp, and the second thermally conductive material is attached to the second side of the acousto-optic material by an adhesive or a mechanical clamp.

7. The optical modulator of claim 1, wherein the acousto-optic assembly further comprises a first structure and a second structure, the first structure is configured to reduce reflection of the incident light beam, and the second structure is configured to reduce reflection of the incident light beam.

8. The optical modulator of claim 7, wherein the first structure comprises a first moth-eye optic, and the second structure comprises a second moth-eye optic.

9. The optical modulator of claim 1, wherein the acousto-optic material comprises germanium (Ge) or gallium arsenide (GaAs).

10. The optical modulator of claim 1, wherein the first thermally conductive material and the second thermally conductive material are polycrystalline diamond or monocrystalline diamond.

11. An extreme ultraviolet (EUV) light source comprising:

an optical source configured to emit a pulsed light beam onto a beam path;

an optical modulator comprising:

an acousto-optic assembly comprising:

an acousto-optic material;

a first side configured to receive the pulsed light beam from the optical source; and a second side configured to emit an output light beam based on the pulsed light beam; and a thermal management apparatus comprising:

a first thermally conductive material in thermal contact with the first side of the acousto-optic assembly, wherein the first side of the acousto-optic assembly comprises a first side of the acousto-optic material and the first thermally conductive material is in thermal contact with the first side of the acousto-optic material; and a second thermally conductive material in thermal contact with the second side of the acousto-optic assembly, wherein the second side of the acousto-optic assembly comprises a second side of the acousto-optic material and the second thermally conductive material is in thermal contact with the second side of the acousto-optic material; wherein the optical modulator further comprises an anti-reflection coating on at least two sides of each of the first thermally conductive material and the second thermally conductive material; and a vacuum chamber comprising an interior configured to receive the output light beam at a target region.

12. The EUV light source of claim 11, wherein:

the first thermally conductive material has a first thickness along a direction of propagation of the pulsed light beam, and the first thickness is an integer multiple of one-fourth of a wavelength of the pulsed light beam; and the second thermally conductive material has a second thickness along a direction of propagation of the pulsed light beam, and the second thickness is an integer multiple of one-fourth of a wavelength of the pulsed light beam.

13. The EUV light source of claim 11, wherein the thermal management apparatus further comprises a heat sink in thermal contact with the first thermally conductive material and the second thermally conductive material.

14. The EUV light source of claim 13, wherein the acousto-optic material comprises:

a third side; and a fourth side, and the heat sink is attached to the third side or the fourth side, wherein the heat sink comprises a first heat sink portion and a second heat sink portion, the first heat sink portion is attached to the third side of the acousto-optic material, and the second heat sink portion is attached to the fourth side of the acousto-optic material.

15. The EUV light source of claim 11, wherein the acousto-optic assembly further comprises a first anti-reflection coating on the acousto-optic material, the first anti-reflection coating is between the acousto-optic material and the first thermally conductive material, a second anti-reflection coating on the acousto-optic material, and the second anti-reflection coating is between the acousto-optic material and the second thermally conductive material.

16. The EUV light source of claim 11, wherein the acousto-optic material further comprises a first structure at the first side, a second structure at the second side, the first structure is configured to reduce reflection of the pulsed light beam, and the second structure is configured to reduce reflection of the pulsed light beam.

17. An optical modulator comprising:

an acousto-optic assembly comprising:

an acousto-optic material;

a first side configured to receive an incident light beam; and a second side configured to emit an output light beam based on the incident light beam; and a thermal management apparatus comprising:

a first thermally conductive material in thermal contact with the first side of the acousto-optic assembly; and a second thermally conductive material in thermal contact with the second side of the acousto-optic assembly, wherein the first thermally conductive material has a first thickness along a direction of propagation of an incident pulsed light beam, and the first thickness is an integer multiple of one-fourth of a wavelength of the incident pulsed light beam; and the second thermally conductive material has a second thickness along a direction of propagation of the incident pulsed light beam, and the second thickness is an integer multiple of one-fourth of a wavelength of the incident pulsed light beam.

18. The optical modulator of claim 17, wherein the acousto-optic assembly further comprises a first anti-reflection coating between the first thermally conductive material and the first side of the acousto-optic material, and a second anti-reflection coating between the second thermally conductive material and the second side of the acousto-optic material, the first thermally conductive material is in thermal contact with the first side of the acousto-optic material by being attached to the first anti-reflection coating, and the second thermally conductive material is in thermal contact with the second side of the acousto-optic material by being attached to the second anti-reflection coating.

19. An optical modulator comprising:

an acousto-optic assembly comprising:

an acousto-optic material;

a first side configured to receive an incident light beam; and a second side configured to emit an output light beam based on the incident light beam;

a thermal management apparatus comprising:

a first thermally conductive material in thermal contact with the first side of the acousto-optic assembly; and a second thermally conductive material in thermal contact with the second side of the acousto-optic assembly;

a first index matching material between the acousto-optic material and the first thermally conductive material; and a second index matching material between the acousto-optic material and the second thermally conductive material.

20. An optical modulator comprising:

an acousto-optic assembly comprising:

an acousto-optic material;

a first side configured to receive an incident light beam; and a second side configured to emit an output light beam based on the incident light beam;

a thermal management apparatus comprising:

a first thermally conductive material in thermal contact with the first side of the acousto-optic assembly, wherein the first side of the acousto-optic assembly comprises a first side of the acousto-optic material and the first thermally conductive material is in thermal contact with the first side of the acousto-optic material; and a second thermally conductive material in thermal contact with the second side of the acousto-optic assembly, wherein the second side of the acousto-optic assembly comprises a second side of the acousto-optic material and the second thermally conductive material is in thermal contact with the second side of the acousto-optic material; and a first structure at the first side and a second structure at the second side, wherein the first structure is configured to reduce reflection of the incident light beam, and the second structure is configured to reduce reflection of the incident light beam.

21. The optical modulator of claim 20, further comprising an anti-reflection coating on at least two sides of each of the first thermally conductive material and the second thermally conductive material.

22. The optical modulator of claim 20, wherein the first structure comprises a first moth-eye optic, and the second structure comprises a second moth-eye optic.

* * * * *